United States Patent
Rochberger et al.

(10) Patent No.: US 6,483,808 B1
(45) Date of Patent: Nov. 19, 2002

(54) METHOD OF OPTIMIZING ROUTING DECISIONS OVER MULTIPLE PARAMETERS UTILIZING FUZZY LOGIC

(75) Inventors: Haim Rochberger, Netanya (IL); Ilan Kirschenbaum, Petach Tivka (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/300,883

(22) Filed: Apr. 28, 1999

(51) Int. Cl.⁷ .............................................. H04L 12/56
(52) U.S. Cl. ........................ 370/238; 370/396; 370/400
(58) Field of Search ............................. 370/238.1, 351, 370/352, 357, 395.1, 395.31, 395.41, 229, 230, 230.1, 231, 235, 396, 400

(56) References Cited

U.S. PATENT DOCUMENTS

| | | | |
|---|---|---|---|
| 4,868,814 A | 9/1989 | BerKovich et al. | |
| 5,079,767 A | 1/1992 | Perlman | |
| 5,172,228 A | 12/1992 | Israelsen | 358/133 |
| 5,291,477 A | 3/1994 | Liew | |
| 5,341,366 A * | 8/1994 | Soumiya et al. | 370/233 |
| 5,361,256 A | 11/1994 | Doeringer et al. | |
| 5,420,861 A | 5/1995 | Perlman | |
| 5,455,865 A | 10/1995 | Perlman | 380/49 |
| 5,483,536 A | 1/1996 | Gunji et al. | |
| 5,491,690 A | 2/1996 | Alfonsi et al. | |
| 5,495,479 A | 2/1996 | Galaand et al. | |
| 5,544,327 A | 8/1996 | Dan et al. | 395/250 |
| 5,550,818 A | 8/1996 | Brackett et al. | |
| 5,566,014 A | 10/1996 | Glance | 359/124 |
| 5,590,118 A | 12/1996 | Nederlof | 370/218 |
| 5,600,638 A | 2/1997 | Bertin et al. | 370/351 |
| 5,603,029 A | 2/1997 | Aman et al. | 395/675 |
| 5,629,930 A | 5/1997 | Beshai et al. | 370/396 |
| 5,649,108 A | 7/1997 | Spiegel et al. | 395/200.12 |
| 5,673,263 A | 9/1997 | Basso et al. | 370/396 |
| 5,751,691 A * | 5/1998 | Soumiya et al. | 370/395.21 |
| 5,812,526 A * | 9/1998 | Chang et al. | 370/230 |
| 5,822,301 A * | 10/1998 | Arnold et al. | 370/238 |
| 5,831,975 A | 11/1998 | Chen et al. | 370/256 |
| 6,623,324 * | 7/2001 | Le Van Suu | 706/1 |

OTHER PUBLICATIONS

Barolli, L. et al "An Intelligent Policing–Routing Mechanism Based on Fuzzy Logic and Genetic Algorithms" Parallel and Distributed Systems, Dec. 14–16, 1998, pp. 390–397.*

Naso, D. et al "A Fuzzy Multi–Criteria Algorithm for Dynamic Routing in FMS" Systems, Man, and Cybernetics, vol. 1, Oct. 11–14, 1998, pp. 457–462.*

(List continued on next page.)

Primary Examiner—Hassan Kizou
Assistant Examiner—Anh-Vu H Ly
(74) Attorney, Agent, or Firm—Howard Zaretsky

(57) ABSTRACT

A method of determining the optimum route from a source to a destination node in an ATM network utilizing fuzzy logic processing to determine the optimum route based on a set metrics that may or may not be related to each other. The invention utilizes well known fuzzy logic techniques to perform optimization and calculations based on intuitive rules rather then complex mathematical solutions. The method of the invention can be applied to routing algorithms to determine the optimum route when it is desired to optimize the route based on a large number of metrics, attributes and/or parameters. The fuzzy logic processing is divided into two phases each having its own set of rules that the input data is applied against. Fuzzy logic processing is performed for all candidate routes wherein the route chosen is the one having a maximum link quality.

17 Claims, 8 Drawing Sheets

OTHER PUBLICATIONS

Lotan, T. "Modelilng Discrete Choice Behavior Based on Explicit Information Integration and its Application to the Route Choice Problem" Systems, Man, and Cybernetics, vol. 28, Issue 1, Jan. 1998, pp. 100–114.*

Ghosh, S. et al "A Survey of Recent Advances in Fuzzy Logic in Telecommunications" Fuzzy Systems, vol. 6, Issue 3, Aug. 1998, pp. 443–447.*

ATM Forum Technical Committee, Private Network–Network Interface Specification Version 1.0, "Appendix B: GCAC Derivation (af–pnni–0055.000)", Mar. 1996, pp. 342–344.

ATM Forum Technical Committee, Traffic Management Specification Version 4.0 (af–tm–0056.000), (1996), pp. 15–17.

ATM Forum Technical Committee, Traffic Management Specification Version 4.0 (atmf–95–0013R8), (1996), pp. 69–70.

Brubaker, D. et al., "Fuzzy–logic system solves control problem", EDN, Jun. 18, 1992, pp. 121–127.

Brubaker, D., "Fuzzy–logic basics: intuitive rules replace complex math", EDN, Jun. 18, 1992, pp. 111–116.

Perlman, R., "Interconnections: Bridges and Routers", Addison–Wesley Publishing, Section 9.2.4, Chapter 9, pp. 205–264 (1992).

Sedgewick, R., "Algorithms", Second Edition, Addison–Wesley Publishing, Chapter 17, pp. 245–257 (1998).

Doeringer, W. et al., "Routing on Longest–Matching Prefixes", *IEEE/ACM Transactions on Networking*, vol. 4, No. 1, Feb. 1996, pp. 86–97.

Williams, K. A., "A Distributed ATM Network Based on an Optical Passive Star", printed from website http://williams.cs.ncat.edu/ATMStar.htm, 2 pages (1998).

"All–optical ATM–Switch based on Self–Electro–optic Effect Devices (SEED's)", printed from website http://www.stw.nl/projecten/T/tel3997.html, 2 pages, Feb. 2, 1997.

* cited by examiner

| | CELL TRANSIT DELAY | | |
|---|---|---|---|
| CELL DELAY VARIANCE | LOW | MEDIUM | HIGH |
| LOW | LOW | MEDIUM | HIGH |
| MEDIUM | MEDIUM | MEDIUM | MEDIUM |
| HIGH | LOW | LOW | MEDIUM |

| | CELL LOSS RATE (CLP=0) | | |
|---|---|---|---|
| CELL LOSS RATE CLP=1 | LOW | MEDIUM | HIGH |
| LOW | LOW | HIGH | HIGH |
| MEDIUM | LOW | MEDIUM | HIGH |
| HIGH | MEDIUM | MEDIUM | HIGH |

METHOD OF OPTIMIZING ROUTING DECISIONS OVER MULTIPLE PARAMETERS UTILIZING FUZZY LOGIC

FIELD OF THE INVENTION

The present invention relates generally to data communications networks and more particularly relates to a method for optimizing PNNI routing decisions over multiple parameters utilizing fuzzy logic.

BACKGROUND OF THE INVENTION

Asynchronous Transfer Mode

Currently, there is a growing trend to make Asynchronous Transfer Mode (ATM) networking technology the base of future global communications. ATM has already been adopted as a standard for broadband communications by the International Telecommunications Union (ITU) and by the ATM Forum, a networking industry consortium.

ATM originated as a telecommunication concept defined by the Comite Consulatif International Telegraphique et Telephonique (CCITT), now known as the ITU, and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

ATM uses very short, fixed length packets called cells., The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, phone, fax, video, data and other information can be transported simultaneously.

ATM is a connection oriented transport service. To access the ATM network, a station requests a virtual circuit between itself and other end stations, using the signaling protocol to the ATM switch. ATM provides the User Network Interface (UNI) which is typically used to interconnect an ATM user with an ATM switch that is managed as part of the same network.

The current standard solution for routing in a private ATM network is described in the Privale Network Node Interface (PNNI) Phase 0 and Phase 1 specifications published by the ATM Forum. The previous Phase 0 draft specification is referred to as Interin Inter-Switch Signaling Protocol (IISP). The goal of the PNNI specifications is to provide customers of ATM network equipment some level of multi-vendor interoperability.

PNNI Phase 1

As part of the ongoing enhancement to the ATM standard by work within the ATM Forum and other groups, the Private Network to Network Interface (PNNI) protocol Phase 1 has been developed for use between private ATM switches and between groups of private ATM switches. The PNNI specification includes two categories of protocols. The first protocol is defined for the distribution of topology information between switches and clusters of switches where the information is used to compute routing paths within the network. The main feature of the PNNI hierarchy mechanism is its ability to automatically configure itself within the networks in which the address structure reflects the topology. The PNNI topology and routing techniques are based on the well-known link state routing technique.

The second protocol is effective for signaling, i.e., the message flows used to establish point-to-point and point-to-multipoint connections across the ATM network. This protocol is based on the ATM Forum User to Network Interface (UNI) signaling with mechanisms added to support source routing, crankback and alternate routing of source SETUP requests in the case of bad connections.

With reference to the PNNI Phase 1 specifications, the PNNI hierarchy begins at the lowest level where the lowest level nodes are organized into peer groups. A logical node in the context of the lowest hierarchy level is the lowest level node. A logical node is typically denoted as simply a node. A peer group is a collection of logical nodes wherein each node within the group exchanges information with the other members of the group such that all members maintain an identical view of the group. When a logical link becomes operational, the nodes attached to it initiate and exchange information via a well known Virtual Channel Connection (VCC) used as a PNNI Routing Control Channel (RCC).

Hello messages are sent periodically by each node on this link. In this fashion the Hello protocol makes the two neighboring nodes known to each other. Each node exchanges Hello packets with its immediate neighbors to determine its neighbor's local state information. The state information includes the identity and peer group membership of the node's immediate neighbors and a status of its links to its neighbors. Each node then bundles its state information in one or more PNNI Topology State Elements (PTSEs) which are subsequently flooded throughout the peer group.

PTSEs are the smallest collection of PNNI routing information that is flooded as a unit among all logical nodes within a peer group. A node topology database consists of a collection of all PTSEs received, which represent that particular node's present view of the PNNI routing topology. In particular, the topology database provides all the information required to compute a route from the given source node to any destination address reachable in or through that routing domain.

When neighboring nodes at either end of a logical link begin initializing through the exchange of Hellos, they may conclude that they are in the same peer group. If it is concluded that they are in the same peer group, they proceed to synchronize their topology databases. Database synchronization includes the exchange of information between neighboring nodes resulting in the two nodes having identical topology databases. A topology database includes detailed topology information about the peer group in which the logical node resides in addition to more abstract topology information representing the remainder of the PNNI routing domain.

During a topology database synchronization, the nodes in question first exchange PTSE header information, i.e., they advertise the presence of PTSEs in their respective topology databases. When a node receives PTSE header information that advertises a more recent PTSE version than the one that it has already or advertises a PTSE that it does not yet have, it requests the advertised PTSE and updates its topology database with the subsequently received PTSE. If the newly initialized node connects to a peer group then the ensuing database synchronization reduces to a one way topology database copy. A link is advertised by a PTSE transmission only after the database synchronization between the respective neighboring nodes has successfully completed. In this fashion, the link state parameters are distributed to all topology databases in the peer group.

Flooding is the mechanism used for advertising links whereby PTSEs are reliably propagated node by node throughout a peer group. Flooding ensures that all nodes in a peer group maintain identical topology databases. A short description of the flooding procedure follows. PTSEs are encapsulated within PNNI Topology State Packets (PTSPs) for transmission. When a PTSP is received its component PTSEs are examined. Each PTSE is acknowledged by encapsulating information from its PTSE header within the acknowledgment packet that is sent back to the sending neighbor. If the PTSE is new or of more recent origin then the node's current copy, the PTSE is installed in the topology database and flooded to all neighboring nodes except the one from which the PTSE was received. A PTSE sent to a neighbor is periodically retransmitted until acknowledged.

Note that flooding is an ongoing activity wherein each node issues PTSPs with PTSEs that contain updated information. The PTSEs contain the topology databases and are subject to aging and get removed after a predefined duration if they are not refreshed by a new incoming PTSE. Only the node that originally originated a particular PTSE can re-originate that PTSE. PTSEs are reissued both periodically and on an event driven basis.

As described previously, when a node first learns about the existence of a neighboring peer node which resides in the same peer group, it initiates the database exchange process in order to synchronize its topology database with that of its neighbor's. The database exchange process involves exchanging a sequence of database summary packets that contain the identifying information of all PTSEs in a node topology database. The database summary packet performs an exchange utilizing a lock step mechanism whereby one side sends a database summary packet and the other side responds with its own database summary packet, thus acknowledging the received packet.

When a node receives a database summary packet from its neighboring peer, it first examines its topology database for the presence of each PTSE described within the packet. If the particular PTSE is not found in its topology database or if the neighboring peer has a more recent version of the PTSE then the node requests the PTSE from the particular neighboring peer or optionally from another neighboring peer whose database summary indicates that it has the most recent version of the PTSE.

A corresponding neighboring peer data structure is maintained by the nodes located on either side of the link. The neighboring peer data structure includes information required to maintain database synchronization and flooding to neighboring peers.

It is assumed that both nodes on either side of the link begin in the Neighboring Peer Down state. This is the initial state of the neighboring peer for this particular state machine. This state indicates that there are no active links through the neighboring peer. In this state, there are no adjacencies associated with the neighboring peer either. When the link reaches the point in the Hello protocol where both nodes are able to communicate with each other, the event AddPort is triggered in the corresponding neighboring peer state machine. Similarly when a link falls out of communication with both nodes the event DropPort is triggered in the corresponding neighboring peer's state machine. The database exchange process commences with the event AddPort which is thus triggered but only after the first link between the two neighboring peers is up. When the DropPort event for the last link between the neighboring peers occurs, the neighboring peer state machine will internally generate the DropPort last event closing all state information for the neighboring peers to be cleared.

It is while in the Negotiating state that the first step is taken in creating an adjacency between two neighboring peer nodes. During this step it is decided which node is the master, which is the slave and it is also in this state that an initial Database Summary (DS) sequence number is decided upon. Once the negotiation has been completed, the Exchanging state is entered. In this state the node describes is topology database to the neighboring peer by sending database summary packets to it.

After the peer processes the database summary packets, the missing or updated PTSEs can then be requested. In the Exchanging state the database summary packets contain summaries of the topology state information contained in the node's database. In the case of logical group nodes, those portions of the topology database that where originated or received at the level of the logical group node or at higher levels is included in the database summary. The PTSP and PTSE header information of each such PTSE is listed in one of the node's database packets. PTSEs for which new instances are received after the exchanging status have been entered may not be included in any database summary packet since they will be handled by normal flooding procedures.

The incoming data base summary packet on the receive side is associated with a neighboring peer via the interface over which it was received. Each database summary packet has a database summary sequence number that is implicitly acknowledged. For each PTSE listed, the node looks up the PTSE in its database to see whether it also has an instance of that particular PTSE. If it does not or if the database copy is less recent, then the node either re-originates the newer instance of the PTSE or flushes the PTSE from the routing domain after installing it in the topology database with a remaining lifetime set accordingly.

Alternatively, if the listed PTSE has expired, the PTSP and PTSE header contents in the PTSE summary are accepted as a newer or updated PTSE with empty contents. If the PTSE is not found in the node's topology database, the particular PTSE is put on the PTSE request list so it can be requested from a neighboring peer via one or more PTSE request packets.

If the PTSE request list from a node is empty, the database synchronization is considered complete and the node moves to the Full state.

However, if the PTSE request list is not empty then the Loading state is entered once the node's last database summary packet has been sent but the PTSE request list is not empty. At this point, the node now knows which PTSE needs to be requested. The PTSE request list contains a list of those PTSEs that need to be obtained in order to synchronize that particular node's topology database with the neighboring peer's topology database. To request these PTSEs, the node sends the PTSE request packet which contains one or more entries from the PTSE request list. The PTSE request list packets are only sent during the Exchanging state and the Loading state. The node can send a PTSE request packet to a neighboring peer and optionally to any other neighboring peers that are also in either the Exchanging state or the Loading state and whose database summary indicate that they have the missing PTSEs.

The received PTSE request packets specify a list of PTSEs that the neighboring peer wishes to receive. For each PTSE specified in the PTSE request packet, its instance is looked up in the node's topology database. The requested PTSEs are subsequently bundled into PTSPs and transmitted to the neighboring peer. Once the last PTSE and the PTSE request list has been received, the node moves from the Loading state to the Full state. Once the Full state has been reached, the node has received all PTSEs known to be available from its neighboring peer and links to the neighboring peer can now be advertised within PTSEs.

A major feature of the PNNI specification is the routing algorithm used to determine a path for a call from a source user to a destination user. The routing algorithm of PNNI is a type of link state routing algorithm whereby each node is responsible for meeting its neighbors and learning their identities. Nodes learn about each other via the flooding of PTSEs described hereinabove. Each node computes routes to each destination user using the information received via the PTSEs to form a topology database representing a view of the network.

Using the Hello protocol and related FSM of PNNI, neighboring nodes learn about each other by transmitting a special Hello message over the link. This is done on a continual periodic basis. When a node generates a new PTSE, the PTSE is flooded to the other nodes within its peer group. This permits each node to maintain an up to date view of the network.

Once the topology of the network is learned by all the nodes in the network, routes can calculated from source to destination users. A routing algorithm commonly used to determine the optimum route from a source node to a destination node is the Dijkstra algorithm. The Dijkstra algorithm is used to generate the Designated Transit List which is the routing list used by each node in the path during the setup phase of the call. Used in the algorithm are the topology database (link state database) which includes the PTSEs received from each node, a Path List comprising a list of nodes for which the best path from the source node has been found and a Tentative List comprising a fist of nodes that are only possibly the best paths. Once it is determined that a path is in fact the best possible, the node is moved from the Tentative List to the Path List.

The algorithm begins with the source node (self) as the root of a tree by placing the source node ID onto the Path List. Next, for each node N placed in the Path List, N's nearest neighbors are examined. For each neighbor M, the cost of the path from the root to N to the cost of the link from N to M is added. If M is not already in the Path List or the Tentative List with a better path cost, M is added to the Tentative List.

If the Tentative List is empty, the algorithm terminates. Otherwise, a search is performed for the entry in the Tentative List with the minimum cost. That entry is moved to the Path List and the examination step described above is repeated.

Fuzzy Logic Based Systems

Currently, fuzzy logic systems are being used in more and more applications. Fuzzy logic, based on fuzzy set theory (a generalization of classical set theory), permits the operational and control laws of a system to be expressed linguistically using words. Many times, such a system out performs systems based on traditional mathematical approaches. The main strength of fuzzy set theory is that it performs well when dealing with imprecision.

In classical set theory, an item is either part of a set or is not, without any room for partial membership. Fuzzy logic permits partial set membership and permits gradual transitions between being a full member of a set and fully being not a member of a set. Fuzzy logic permits partial truth and partial falseness. For example, the statement. "The car is traveling fast" can have a range of truthfulness, depending on the speed of the car. If the car is traveling 30 mph the statement may be 40% true but if it is traveling 50 mph it may be 70% true. Thus, the path from falseness to truth is gradual.

The degree to which a variable is a member of a set is denoted by a degree of membership variable. Each fuzzy logic input variable and each output variable has an associated degree of membership function. Membership varies from 0 to 1, inclusive, and is the degree (usually represented by $\mu$) that is termed the truth value and represents the degree to which an assertion is true.

PNNI Source Routing

The PNNI protocol, widely implemented in ATM networks, performs source routing to from source to destination nodes. The routing algorithm in PNNI generates the data path, i.e., the VC, between the source and destination. The routing algorithm selects one or more optional or candidate routes to the destination based on a criteria such as number of hops to the destination. The routing algorithm then determines the best or optimum route from among a plurality of possible optional routes using an optimization technique that examines one or more metrics, attributes and/or parameters associated with each optional route. Note that a metric is defined as an entity that accumulates, e.g., CTD while an attribute is a property of the network, e.g., an address, link capacity, node attributes, etc.

The number of optimizations metrics and attributes can vary according to the algorithm and/or protocol in use. Ideally, more than just a few of these should be taken into consideration when selecting a route since a route is characterized by many metrics, attributes and parameters as the link load, cell delay, cell delay variation, etc. When the number of metrics, attributes and/or parameters is few, e.g., one or two, the solution to the routing problem is relatively simple. Numerous methods of resolving the best or optimum route are well known in the networking art. Such well known techniques include, but are not limited to, methods that utilize one or more weighted averages and method that optimize based on the shortest path from one point to another.

The task of finding the optimum route becomes much more complicated, however, when the number of optimization parameters becomes larger than one or two. In a large group of metrics, attributes and parameters, it is typically the case that the individual members of the group relate very little with each other with each having varying degrees of importance in the determination of the route. For example, consider determining the best or optimum route based on the consideration of ten metrics, attributes and parameters. Each one having a different importance to the optimization process and each being totally unrelated to the others in meaning.

Performing routing decisions based on this data becomes a very complicated mathematical problem especially when the decision models the metrics, attributes and parameters as a non linear system whose behavior varies with time.

SUMMARY OF THE INVENTION

The present invention is a method of determining the optimum route from a source node to a destination node in an ATM network. The method utilizes fuzzy logic processing to determine the optimum route based on a set of metrics that may or may not be related to each other. The invention utilizes well known fuzzy logic techniques to perform optimization and calculations based on intuitive rules rather then complex mathematical solutions.

As an example, the method of the invention can be applied to PNNI routing in ATM networks. The PNNI protocol functions to route the data path between the source and destination using source routing techniques. Various criteria are used by the routing algorithm to determine the optimum path. The method of the invention can be used by the routing algorithm to determine the optimum route when it is desired to optimize the route based on a large number of metrics, attributes and/or parameters. The example described hereinbelow considers a set of nine metrics for evaluating each proposed route.

The fuzzy logic processing is divided into two phases. Each phase has its own set of rules that the input data are applied to. The first set of rules are used to divide the metrics into a smaller number of groups wherein each group contains metrics that relate to each other in some way. Crisp output values are calculated for each of the resulting groups. These values are then input to the second phase set of rules. The outputs generated are defuzzified and a single crisp output value is obtained. The centroid and weighted-average techniques in combination with the membership function for the output values are used to perform defuzzification. The output value generated represents an indication of the link quality on a scale of 0 to 100, for example.

A different set of metrics is processed for each optional route being considered by the routing algorithm. For each set a link quality value is determined. Once processing for all candidate routes s complete, the route having the maximum link quality indication is chosen and the route is configured.

There is provided in accordance with the present invention a method of optimizing the routing from a source node to a destination node based on a plurality of metrics, the method comprising the steps of providing a membership function for each metric to be considered in the optimization, providing a membership function for each fuzzy output to be generated, fuzzifying a set of crisp input values corresponding to the plurality of metrics so as to yield a set of fuzzy input values, applying the set of fuzzy input values to a fuzzy logic rule base so to yield a set of fuzzy output values, defuzzifying the set of fuzzy output values so as to yield a crisp output value indicative of the link quality associated with a particular candidate route, repeating the steps of fuzzifying, applying and defuzzifying for each candidate route to be considered and selecting the route having a maximum link quality indication as a final routing decision.

The step of defuzzifying comprises the step of utilizing a centroid technique to obtain crisp values for each rule within the fuzzy logic rule base triggered by the set of fuzzy input values or may comprise the step of utilizing a weighted-average technique to obtain a single crisp value from a plurality of crisp values generated from rules within the fuzzy logic rule base triggered by the set of fuzzy input values.

The method further comprises the step of dividing the set of metrics into a plurality of groups, wherein each group corresponds to one or more metric and is represented by a single fuzzy input value. The method further comprises the step of implementing the selected route utilizing the metrics corresponding thereto. The fuzzy logic rule base may embody different weights assigned to individual metrics.

There is also provided in accordance with the present invention a method of optimizing the routing from a source node to a destination node based on a plurality of metrics, the method comprising the steps of providing a membership function for each metric to be considered in the optimization, providing a membership function for each fuzzy output to be generated, dividing the plurality of metrics into one or more groups, fuzzifying a set of crisp input values corresponding to each group of metrics so as to yield a first plurality of sets of fuzzy input values, applying each first set of fuzzy input values to a first fuzzy logic rule base so to yield a first set of fuzzy output values, each group having an associated different first fuzzy logic rule base, defuzzifying the first set of fuzzy output values so as to yield a first crisp output value, fuzzifying the first crisp output value of each group so as to yield a second plurality of sets of fuzzy input values, applying each second set of fuzzy input values to a second fuzzy logic rule base so to yield a second set of fuzzy output values, defuzzifying the second set of fuzzy output values so as to yield a second crisp output value indicative of the link quality associated with a particular candidate route, generating a crisp output value indicative of the link quality for each candidate route to be considered and selecting the route having a maximum link quality indication as a final routing decision.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| ACR | Available Cell Rate |
| ANSI | American National Standards Institute |
| ATM | Asynchronous Transfer Mode |
| CBR | Constant Bit Rate |
| CCITT | Comite Consulatif International Telegraphique et Telephonique |
| CDV | Cell Delay Variation |
| CLP | Cell Loss Priority |
| CLR | Cell Loss Rate |
| CRM | Cell Rate Margin |
| CTD | Cell Transfer Delay |
| DS | Database Summary |
| FDDI | Fiber Distributed Data Interface |
| FSM | Finite State Machine |
| GCAC | Generic Connection Admission Control |
| IISP | Interim Inter-Switch Signaling Protocol |
| ITU | International Telecommunications Union |
| PCR | Peak Cell Rate |
| PNNI | Private Network to Network Interface |
| PTSE | PNNI Topology State Element |
| PTSP | PNNI Topology State Packet |
| RCC | Routing Control Channel |
| SCR | Sustained Cell Rate |
| UNI | User to Network Interface |
| VC | Virtual Circuit |
| VCC | Virtual Channel Connection |
| VF | Variance Factor |

General Description

The present invention is a method of using fuzzy logic to optimize the performance of a routing algorithm when the routing decision is based on multiple metrics, attributes and/or parameters. Using well known fuzzy logic techniques based on fuzzy set theory, the invention permit optimization and calculation of an optimized route based on intuitive rules without requiring the solution of complex mathematical models based on non linear systems. In addition, the use of fuzzy logic to optimize the routing based on multiple metrics provides a solution that is much more understandable and intuitive then those reached by more traditional mathematical approaches.

To aid in illustrating the principles of the present invention, the description presented herein uses ATM based PNNI routing as an example. It is important to note that the principles of the present invention can be applied to other routing schemes as well and is not limited to PNNI based networks. In addition, the metric, attributes and parameters described below are intended for illustration purposes only. The method of the present invention can be applied by one skilled in the art to any number of metrics, attributes and/or parameters without departing from its scope.

The basics of fuzzy logic are well known and will not be described in detail here. An explanation of fuzzy logic can be found in "Fuzzy-Logic Basics: Intuitive Rules Replace Complex Math," David I. Brubaker, EDN, Jun. 18, 1992, pages 111–116, incorporated herein by reference. An illustrative application of fuzzy logic to a real world setting can be found in "Fuzzy-Logic System Solves Control Problem," David I. Brubaker and Cedric Sheerer, EDN, Jun. 18, 1992, pages 121–128, incorporated herein by reference.

Figure 1:
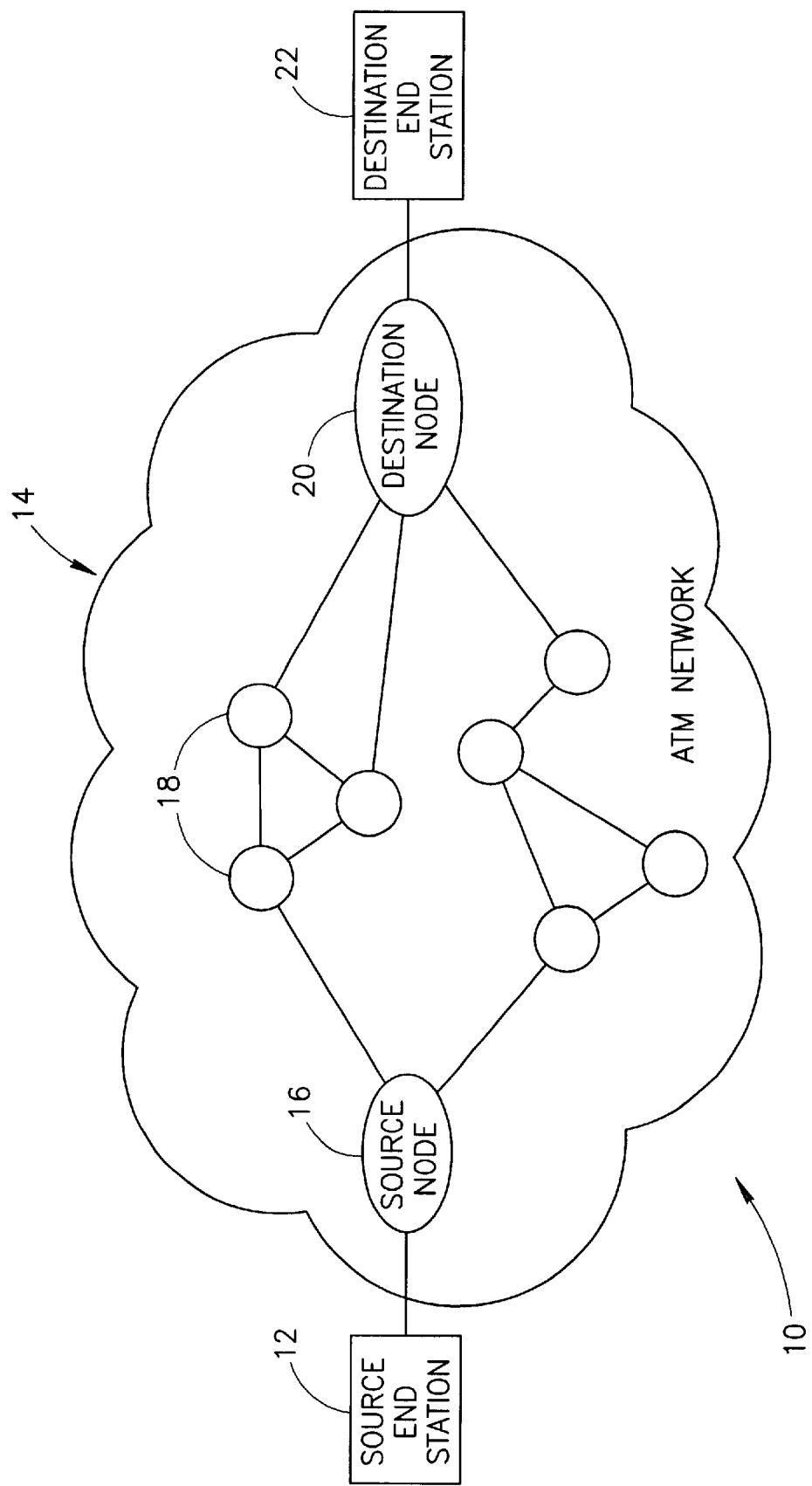
FIG. 1 is a block diagram illustrating an example ATM network having a source and destination edge node connectable via multiple paths through the network.

A block diagram illustrating an example ATM network having a source and destination edge node connectable via multiple paths through the network is shown in FIG. 1. The example ATM network, generally referenced 10, comprises a source end station 12 coupled to a source node 16 and a destination end station 22 coupled to a destination node 20. The source node 16 is coupled to a plurality of intermediate nodes 18 making up the ATM cloud 14. The destination node is also coupled to a plurality of intermediate nodes 18.

When the source end station 12 desires to connect with the destination end station 22 it transmits a SETUP request which is received by the source node 16. PNNI routing algorithms on the source node calculate a best (optimum) route to the destination based on several criteria. The source node utilizes the information contained in its topology database to perform its analyses and to make its decision. The method of the present invention is adapted to be implemented on the source node and is used to determine the optimum route to the destination when multiple metrics, attributes and/or parameters are to be considered in the routing decision.

The example presented herein to illustrate the principles of the present invention makes routing decisions based on nine metrics, attributes and parameters (hereinafter simple referred to as metrics). Each metric is assigned an independent weight and fuzzy logic is used to make the final route selection from among the various candidate routes.

The metrics to be optimized include the following:
ADMIN_WGT Administrative Weight
MAX_CR Maximum Cell Rate
ACR Available Cell Rate
CTD Cell Transfer Delay
CLR_CLP0 Cell Loss Rate, CLP=0 traffic
CLR_CLP1 Cell Loss Rate, CLP=1 traffic
CRM Cell Rate Margin
VF Variance Factor These metrics generally described the links and nodes making up the network and are advertised by the nodes using a plurality of PTSEs. The metrics listed above are input to the fuzzy logic mechanism of the present invention. The output of the fuzzy logic processing system is a number that characterizes the quality of the route. The metrics associated with each optional route being considered is input to the fuzzy logic system. The resulting output number is used by the PNNI routing algorithm to compare between the routes and choose an optimum.

Initially, the nine metrics listed above are divided into five groups, each group being composed of one or more metrics. This functions to divide the metrics into groups that logically belong together whereby each resulting group is typically not related to the other groups. The list of groups the metrics are placed into is provided below.
CELL_RATE represents MAX_CR and ACR
CELL_DELAY represents CTD and CDV
CLR_CLP represents CLR_CLP0 and CLR_CLP1
CRM_VF represents CRM and VF
ADMIN_WGT represents ADMIN_WGT only Note that the ADMIN_WGT is a metric, i.e., number, assigned by the network manager wherein routes with a minimum ADMIN_WGT are used to locate routes having minimal hop count. Note also that the CELL_RATE group is assigned the highest important (priority) while the ADMIN_WGT is assigned the lowest importance or priority.

Each of the nine metrics has associated with it a fuzzy logic membership function. Crisp values of the metrics are fuzzified into fuzzy input variables. Each group has associated with it a set of rules that use the fuzzy input variables to generate a fuzzy output variable. Each rule is expressed in linguistic form as:

if (condition or antecedent) then (action or consequence)
Each group has associated with it a plurality of rules that are described in more detail hereinbelow. The method presented herein is comprised of two phases or portions. In the first phase, the nine metrics are fuzzified into five fuzzy input variables. These five fuzzy input variables are then input to a second set of rules which are used to determine the final fuzzy output variable representing the link quality.

Figure 2:
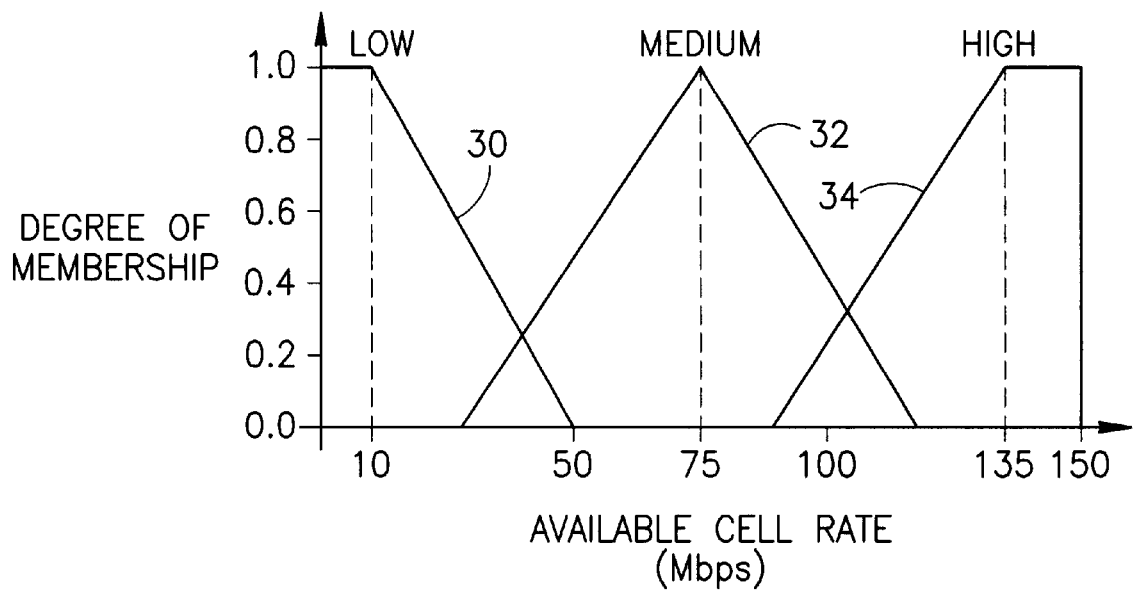
FIG. 2 is a diagram illustrating the degree of membership function for the Available Cell Rate (ACR) parameter.

The first fuzzy processing phase will now be described in more detail. A diagram illustrating the degree of membership function for the Available Cell Rate (ACR) parameter is shown in FIG. 2. The Available Cell Rate membership function fuzzifies the crisp input into three fuzzy values representing three fuzzy sets: LOW, MEDIUM and HIGH. Note that the membership functions for the three fuzzy set values overlap. Crisp ACR values are assigned fuzzy values in accordance with the membership function. Alternatively, the input variables can have a number of fuzzy membership sets greater than or less then three, e.g., five sets comprising: LOW, MID-LOW, MID, MID-HIGH and HIGH. For clarity sake the examples presented herein comprise three fuzzy membership sets.

Note that the same degree of membership function applies for the Maximum Cell Rate (MAX_CR) metric as well. The crisp input values for ACR and MAX_CR are fuzzified to the fuzzy variables AVAILABLE_CELL_RATE and MAX_CELL_RATE, respectively. A degree of membership value ranging between 0 and 1 and denoted by $\mu$ is assigned to each.

As described above, a set of rules is associated with the CELL_RATE group for mapping the inputs to the CELL_RATE output variable. A list of the rules is presented below.
1. If (MAX_CELL_RATE is HIGH and AVAILABLE_CELL_RATE is HIGH) then (CELL_RATE is HIGH)
2. If (MAX_CELL_RATE is HIGH and AVAILABLE_CELL_RATE is MEDIUM) then (CELL_RATE is MEDIUM)
3. If (MAX_CELL_RATE is MEDIUM and AVAILABLE_CELL_RATE is HIGH) then (CELL_RATE is MEDIUM)
4. If (MAX_CELL_RATE is MEDIUM and AVAILABLE_CELL_RATE is MEDIUM) then (CELL_RATE is MEDIUM)
5. If (MAX_CELL_RATE is LOW and AVAILABLE_CELL_RATE is MEDIUM) then (CELL_RATE is LOW)
6. If (MAX_CELL_RATE is LOW and AVAILABLE_CELL_RATE is LOW) then (CELL_RATE is LOW)

Figure 3:
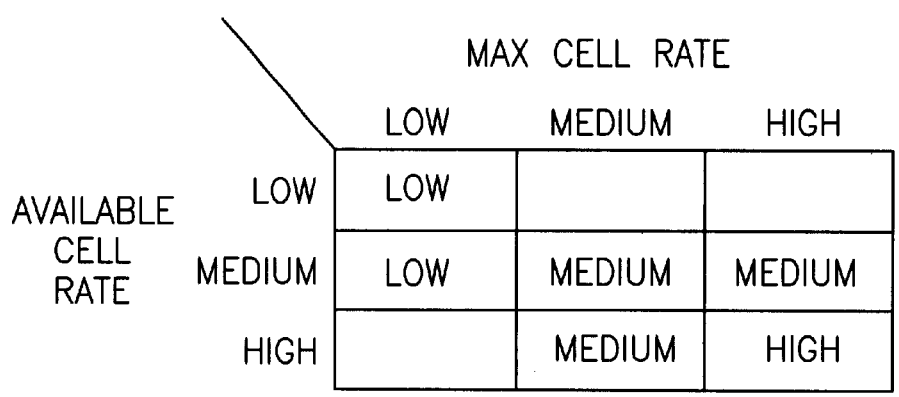
FIG. 3 is a table illustrating the first level of fuzzy rules for the CELL_RATE group of metrics.

A table summarizing the first level of fuzzy rules for the CELL_RATE group of metrics is shown in FIG. 3. The three possible values for AVAILABLE_CELL_RATE are listed vertically while the three possible values for MAX_CELL_RATE are listed horizontally. Note that optionally the entire table can be filled up but this is not always a requirement. Depending on the implementation, one or more rule cells can be left out, for example, if their meaning does not make sense.

For each set of crisp input values, a set of fuzzy input variables are assigned values. Note that the fuzzy AND operator is not a Boolean AND operator. The fuzzy AND means that the lesser value from among the degree of membership functions is used. The fuzzy OR operator means that the greater value from among the degree of membership functions is used.

The two degrees of membership, corresponding to the two input variables, then trigger one or more rules. The result is one or more output variables with a degree of membership for each rule that was triggered. In this case, the output corresponds to the AND of the two input variables. These results are then combined and converted to a crisp output that is then used as input to the second phase of fuzzy rule processing. Note that in the case for this group, the output membership function is the same as the membership function for the two input variables. Normally, however, this may or may not be the case. Each input variable and each output variable may have its own unrelated membership function.

The well known centroid technique combined with the weighted-average method is used to generate a crisp output. The centroid technique is used to defuzzify the output and generate a centroid result for each rule triggered. The resulting centroids are combined using the weighted-average method where each centroid result is multiplied by its degree of membership value.

As an example consider a MAX_CR of 40 and an ACR of 80. The MAX_CR crisp input is fuzzified into the fuzzy variable MAX_CELL_RATE having a degree of membership in two fuzzy sets LOW (=0.4) and MEDIUM (=0.3). The ACR crisp input is fuzzified into the fuzzy variable AVAILABLE_CELL_RATE having a degree of membership in the fuzzy set MEDIUM (=0.8).

Applying these fuzzy inputs to the rules results in rules 4 and 5 being triggered. The results are an output variable CELL_RATE in the fuzzy sets MEDIUM (=0.3) and LOW (=0.4). The resulting centroids for these are 80 and 25, respectively. Combining these results using the weighted average method yields the crisp value for CELL_RATE of 49.

$$\text{CELL\_RATE} = \frac{80(0.3) + 25(0.4)}{0.3 + 0.4} \qquad (1)$$
$$= 49$$

This crisp output for CELL_RATE serves as subsequent crisp input for the second phase fuzzy logic processing.

Figures 4, 5:
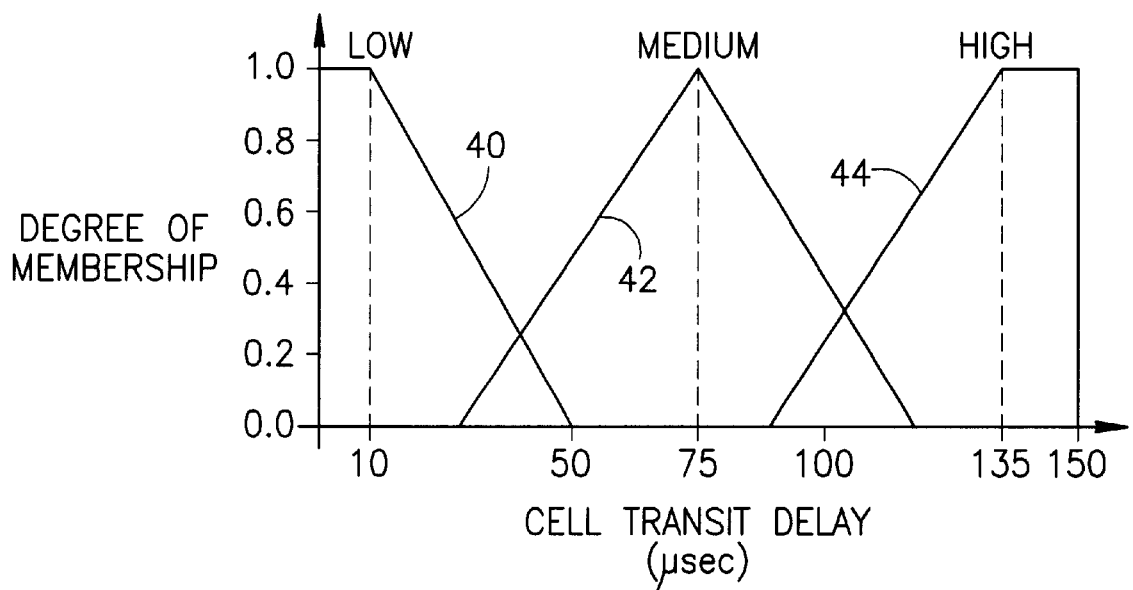
FIG. 4 is a diagram illustrating the degree of membership function for the Cell Transfer Delay (CTD) parameter.
FIG. 5 is a table illustrating the first level of fuzzy rules for the CELL_DELAY group of metrics.

Similarly as with the MAX_CR and ACR metrics, the Cell Transfer Delay (CTD) and Cell Delay Variation (CDV) crisp inputs are fuzzified and processed by a plurality of fuzzy rules. A diagram illustrating the degree of membership function for the Cell Transfer Delay (CTD) parameter is shown in FIG. 4. The Cell Transfer Delay membership function fuzzifies the crisp CTD input into three fuzzy values representing three fizzy sets: LOW, MEDIUM and HIGH. Note that the membership functions for the three fuzzy set values overlap. Crisp CTD values are assigned fuzzy values in accordance with the membership function.

In PNNI CDV functions indicates how much the measured cell delay varies with respect to an average value. Further details about the CDV and CTD can be found in the ATM Forum Technical Committee Traffic Management Specification Version 4.0, pages 15–17, 69–70, incorporated herein by reference.

Note that the same degree of membership function applies for the Cell Delay Variation CDV) metric as well. The crisp input values for CTD and CDV are fuzzified to the fuzzy variables CELL_TRANSFER_DELAY and CELL_DELAY_VARIATION, respectively. A degree of membership value ranging between 0 and 1 and denoted by $\mu$ is assigned to each.

As described above, a set of rules is associated with the CELL_DELAY group for mapping the inputs to the CELL_DELAY output variable. A list of the rules is presented below.

1. If (CELL_TRANSFER_DELAY is LOW and CELL_DELAY_VARIATION is LOW) then (CELL_DELAY is LOW)
2. If (CELL_TRANSFER_DELAY is MEDIUM and CELL_DELAY_VARIATION is LOW) then (CELL_DELAY is MEDIUM)
3. If (CELL_TRANSFER_DELAY is HIGH and CELL_DELAY_VARIATION is LOW) then (CELL_DELAY is HIGH)
4. If (CELL_TRANSFER_DELAY is LOW and CELL_DELAY_VARIATION is MEDIUM) then (CELL_DELAY is MEDIUM)
5. If (CELL_TRANSFER_DELAY is MEDIUM and CELL_DELAY_VARIATION is MEDIUM) then (CELL_DELAY is MEDIUM)
6. If (CELL_TRANSFER_DELAY is HIGH and CELL_DELAY_VARIATION is MEDIUM) then (CELL_DELAY is MEDIUM
7. If (CELL_TRANSFER_DELAY is LOW and CELL_DELAY_VARIATION is HIGH) then (CELL_DELAY is LOW)
8. If (CELL_TRANSFER_DELAY is MEDIUM and CELL_DELAY_VARIATION is HIGH) then (CELL_DELAY is LOW)
9. If (CELL_TRANSFER_DELAY is HIGH and CELL_DELAY_VARIATION is HIGH) then (CELL_DELAY is MEDIUM)

A table summarizing the first level of fuzzy rules for the CELL_DELAY group of metrics is shown in FIG. 5. The three possible values for CELL_DELAY_VARIATION are listed vertically while the three possible values for CELL_TRANSFER_DELAY are listed horizontally.

For each set of crisp input values, a set of fuzzy input variables are assigned values. The two degrees of membership, corresponding to the two input variables, then trigger one or more rules. The result is one or more output variables with a degree of membership for each rule that was triggered. In this case, the output corresponds to the AND of the two input variables. These results are then combined and converted to a crisp output that is then used as input to the second phase of fuzzy rule processing. Note that in the case for this group, the output membership function is the same as the membership function for the two input variables. Normally, however, this may or may not be the case. Each input variable and each output variable may have its own unrelated membership function.

The well known centroid technique combined with the weighted-average method is used to generate a crisp output. The centroid technique is used to defizzify the output and generate a centroid result for each rule triggered. The resulting centroids are combined using the weighted-average method where each centroid result is multiplied by its degree of membership value. The crisp output obtained for CELL_DELAY serves as subsequent crisp input for the second phase fuzzy logic processing.

The third group, represented by the variable CLR_CLP, gives an indication of the number of cells with high and low priorities that have been discarded by the system. High values of CLR_CLP0 indicate that the system is discarding a lot of cells with high priority. This happens when the route becomes severely loaded and any cell entering this route gets discarded. The units of these metrics are expressed in terms of one cell lost per number of cells, e.g., $10^{-15}$ indicates one cell lost per $10^{15}$ cells.

Figures 6, 7:
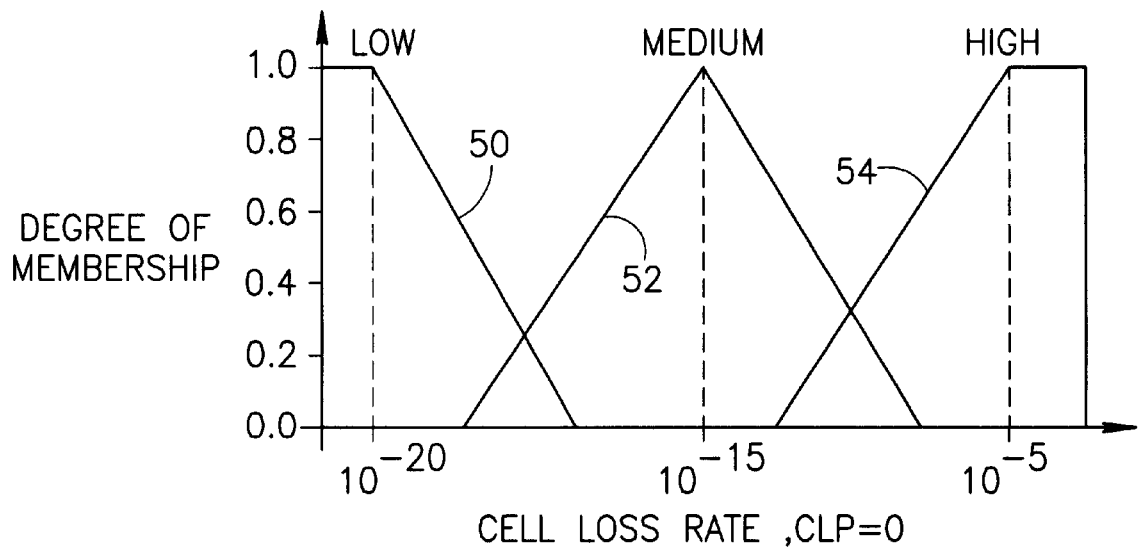
FIG. 6 is a diagram illustrating the degree of membership function for the Cell Loss Rate (CLR) parameter.
FIG. 7 is a table illustrating the first level of fuzzy rules for the CLR_CLP group of metrics.

A diagram illustrating the degree of membership function for the Cell Loss Rate (CLP=0) parameter is shown in FIG. 6. The Cell Loss Rate (CLP=0) membership function fuzzi-fies the crisp CLR (CLP=0) input into three fuzzy values representing three fuzzy sets: LOW, MEDIUM and HIGH. Note that the membership functions for the three fuzzy set values overlap. Crisp CLR (CLP=0) values are assigned fuzzy values in accordance with the membership function.

Note that the same degree of membership function applies for the Cell Loss Rate (CLP=1) metric as well. The crisp input values for both are fuzzified to the fuzzy variables CELL_LOSS_RATE_(CLP=0) and CELL_LOSS_RATE_(CLP=1). A degree of membership value ranging between 0 and 1 and denoted by $\mu$ is assigned to each.

As described above, a set of rules is associated with the CELL_DELAY group for mapping the inputs to the CELL_DELAY output variable. A list of the rules is not presented but can be constructed from the rules table presented below in connection with FIG. 7.

A table summarizing the first level of fuzzy rules for the CLR_CLP group of metrics is shown in FIG. 7. The three possible values for CELL_LOSS_RATE_(CLP=1) are listed vertically while the three possible values for CELL_LOSS_RATE_(CLP=0) are listed horizontally.

For each set of crisp input values, a set of fuzzy input variables are assigned values. The two degrees of membership, corresponding to the two input variables, then trigger one or more rules. The result is one or more output variables with a degree of membership for each rule that was triggered. In this case, the output corresponds to the AND of the two input variables. These results are then combined and converted to a crisp output that is then used as input to the second phase of fuzzy rule processing. Note that in the case for this group, the output membership function is the same as the membership function for the two input variables. Normally, however, this may or may not be the case. Each input variable and each output variable may have its own unrelated membership function.

The well known centroid technique combined with the weighted-average method is used to generate a crisp output, as described hereinabove. The crisp output obtained for CLR_CLP serves as subsequent crisp input for the second phase fuzzy logic processing.

The fourth group of metrics, represented by CRM_VF, is made up of the Cell Rate Margin (CRM) and Variance Factor (VF) metrics. Detailed descriptions of the CRM and VF metrics can be found in ATM Forum PNNI Specification Version 1.0, pages 342–344, March 1996. The CRM and VF metrics provide an indication of utilization of allocated bandwidth by existing VCs and an indication of whether the initial allocation has satisfied their initial demand. The Cell Rate Margin (CRM) parameter increasing indicates that the link is more usable since there is more available bandwidth, i.e., aggregation of rate margins, that can be allocated for new VCs.

The Variance Factor (VF) parameter provides an indication of the utilization of the bandwidth allocated to a VC. The VF parameter can be used by the Generic Connection Admission Control (GCAC) algorithm to estimate how much bandwidth is required to carry an additional connection.

The following example clarifies the use of these parameters. Assume the following two VCs have been established with Peak Cell Rate (PCR) and Sustained Cell Rate (SCR) according to the following:
VC #1: PCR==100 Mbps, SCR=80 Mbps
VC #2: PCR=8 Mbps, SCR=6 Mbps According to the standard $$CMR\_link = \sum_{\substack{over\ all \\ existing \\ connections}} (PCR - SCR) \quad \text{and} \quad (2)$$

$$VAR\_link = \sum_{\substack{over\ all \\ existing \\ connections}} SCR \cdot (PCR - SCR) \quad (3)$$

and thus $$VF\_link = \frac{CRM\_link^2}{VAR\_link} \quad (4)$$

replacing the variables with the data yields $$VF\_link = \frac{(20+2)^2}{(80 \cdot 20) + (6 \cdot 2)} \quad (5)$$
$$= 0.3002$$

Suppose now that the SCR of VC #2 decreases from 6 Mbps to 3 Mbps. The value of VF_link is now given by.

$$VF\_link = \frac{(20+5)^2}{(80 \cdot 20) + (3 \cdot 5)} \quad (6)$$
$$= 0.386$$

Now, however, suppose that the SCR of VC #1 decreases from 80 Mbps to 40 Mbps while the SCR of VC #1 remains at 6 Mbps. The value of VF_link is now given by.

$$VF\_link = \frac{(60+2)^2}{(60 \cdot 40) + (6 \cdot 2)} \quad (7)$$
$$= 1.593$$

It is thus apparent that as VF increases, the bandwidth wasted also increases. When the CRM parameter yields a qualitative idea of the bandwidth waste, the VF parameter provides a qualitative idea of the waste also.

Consider the following two examples which also serve as illustrations.

EXAMPLE 1

Consider two VCs with the following characteristics.

VC #1: PCR==100 Mbps, SCR=50 Mbps
VC #2: PCR=80 Mbps, SCR=60 Mbps

According to the standard the following can be calculated.

$$VF\_link = \frac{(50+20)^2}{(50 \cdot 50) + (60 \cdot 20)} \quad (8)$$
$$= 1.324$$

Now suppose, that the SCR of VC #1 is changed to 70 Mbps. This yields the following.

$$VF\_link = \frac{(30+20)^2}{(70 \cdot 30) + (60 \cdot 20)} \quad (9)$$
$$= 0.757$$

Suppose now that the SCR of VC #2 changes to 2 Mbps that represents a huge bandwidth waste. The SCR of VC #1 remains as it was initially, i.e., 50 Mbps. This yields the following.

$$VF\_link = \frac{(50+78)^2}{(50 \cdot 50) + (78 \cdot 2)} \quad (10)$$
$$= 6.168$$

EXAMPLE 2

This example illustrates the usage of the VF parameter when dealing with VCs allocated with narrow bandwidths. Consider two VCs with the following characteristics.

VC #1: PCR==12 Mbps, SCR=3 Mbps
VC #2: PCR=24 Mbps, SCR=8 Mbps

According to the standard the following can be calculated.

$$VF\_link = \frac{(9+16)^2}{(3 \cdot 9) + (8 \cdot 16)} \quad (11)$$
$$= 4.032$$

Now suppose, that the SCR of VC #1 is changed to 10 Mbps. This yields the following.

$$VF\_link = \frac{(2+16)^2}{(2 \cdot 10) + (8 \cdot 16)} \quad (12)$$
$$= 2.189$$

For relatively small waste, we set SCR of VC #1 to 20 Mbps and SCR of VC #2 to 10 Mbps, which yields the following.

$$VF\_link = \frac{(2+4)^2}{(20 \cdot 4) + (10 \cdot 2)} \quad (13)$$
$$= 0.36$$

Figure 8:
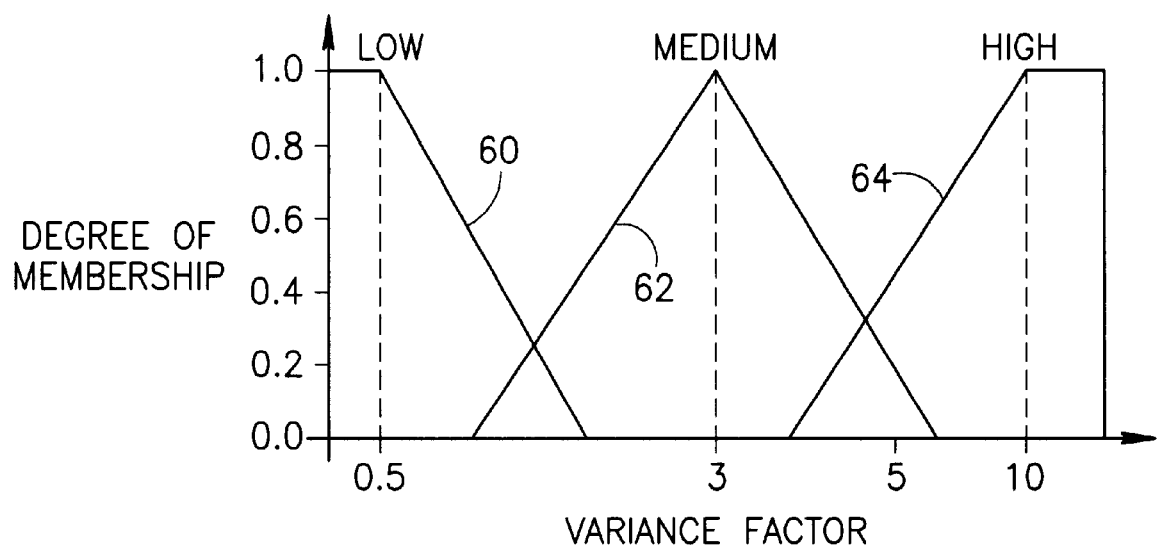
FIG. 8 is a diagram illustrating the degree of membership function for the Variance Factor (VF) parameter.

A diagram illustrating the degree of membership function for the Variance Factor (VF) parameter is shown in FIG. 8. Since the VF parameter can reach very large values, the fuzzy membership function is set as shown. The VF membership function fuzzifies the crisp VF input into three fuzzy values representing three fuzzy sets: LOW, MEDIUM and HIGH. Note that the membership functions for the three fuzzy set values overlap. Crisp VF values are assigned fuzzy values in accordance with the membership function.

Note that the same degree of membership function applies for the CRM metric as well. The crisp input values for both are fuzzified to the fuzzy variables VF and CRM. A degree of membership value ranging between 0 and 1 and denoted by $\mu$ is assigned to each.

As described above, a set of rules is associated with the CELL_DELAY group for mapping the inputs to the CELL_DELAY output variable. A list of the rules is not presented but can be constructed from the rules table presented below in connection with FIG. 9.

Figure 9:
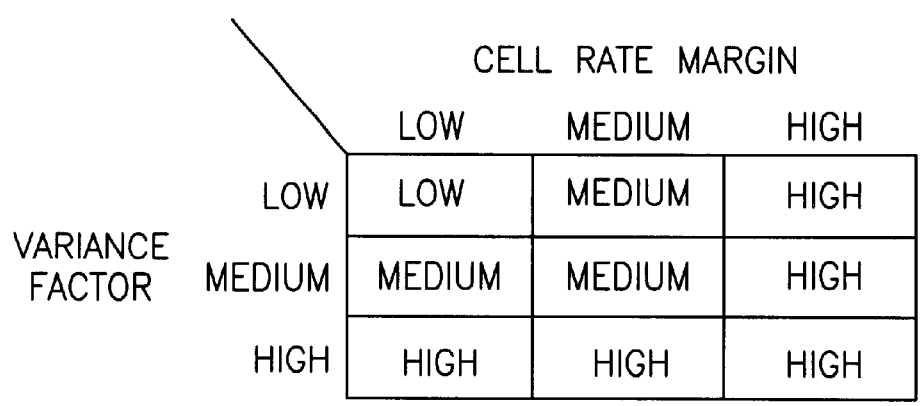
FIG. 9 is a table illustrating the first level of fuzzy rules for the CLM_VF group of metrics.

A table summarizing the first level of fuzzy rules for the CRM_VF group of metrics is shown in FIG. 9. The three possible values for VF are listed vertically while the three possible values for CRM are listed horizontally.

For each set of crisp input values, a set of fuzzy input variables are assigned values. The two degrees of membership, corresponding to the two input variables then trigger one or more rules. The result is one or more output variables with a degree of membership for each rule triggered. In this case, the output corresponds to the AND of the two input variables. These results are then combined and converted to a crisp output that is then used as input to the second phase of fuzzy rule processing. Note that in the case for this group, the output membership function is the same as the membership function for the two input variables. Normally, however this may or may not be the case. Each input variable and each output variable may have its own unrelated membership function.

The well known centroid technique combined with the weighted-average method is used to generate a crisp output, as described hereinabove. The crisp output obtained for CRM_VF serves as subsequent crisp input for the second phase fuzzy logic processing.

The fifth group comprises the single metric ADMIN_WGT and the fuzzification of the input can be using any desired number of fuzzy sets, e.g., three for LOW, MEDIUM and HIGH. The values may range from 0 to 100 representing the weight assigned by the network administrator.

At this point, the five crisp output values have been obtained for the five groups of metrics as a result of the first level of fuzzy logic processing. These five results are used as input to the second level of fuzzy logic processing which comprises a second set of fuzzy logic rules. This second set of rules are used to generate the final number that gives necessary meaning upon which the PNNI routing algorithm can base its route determination.

Figure 10:
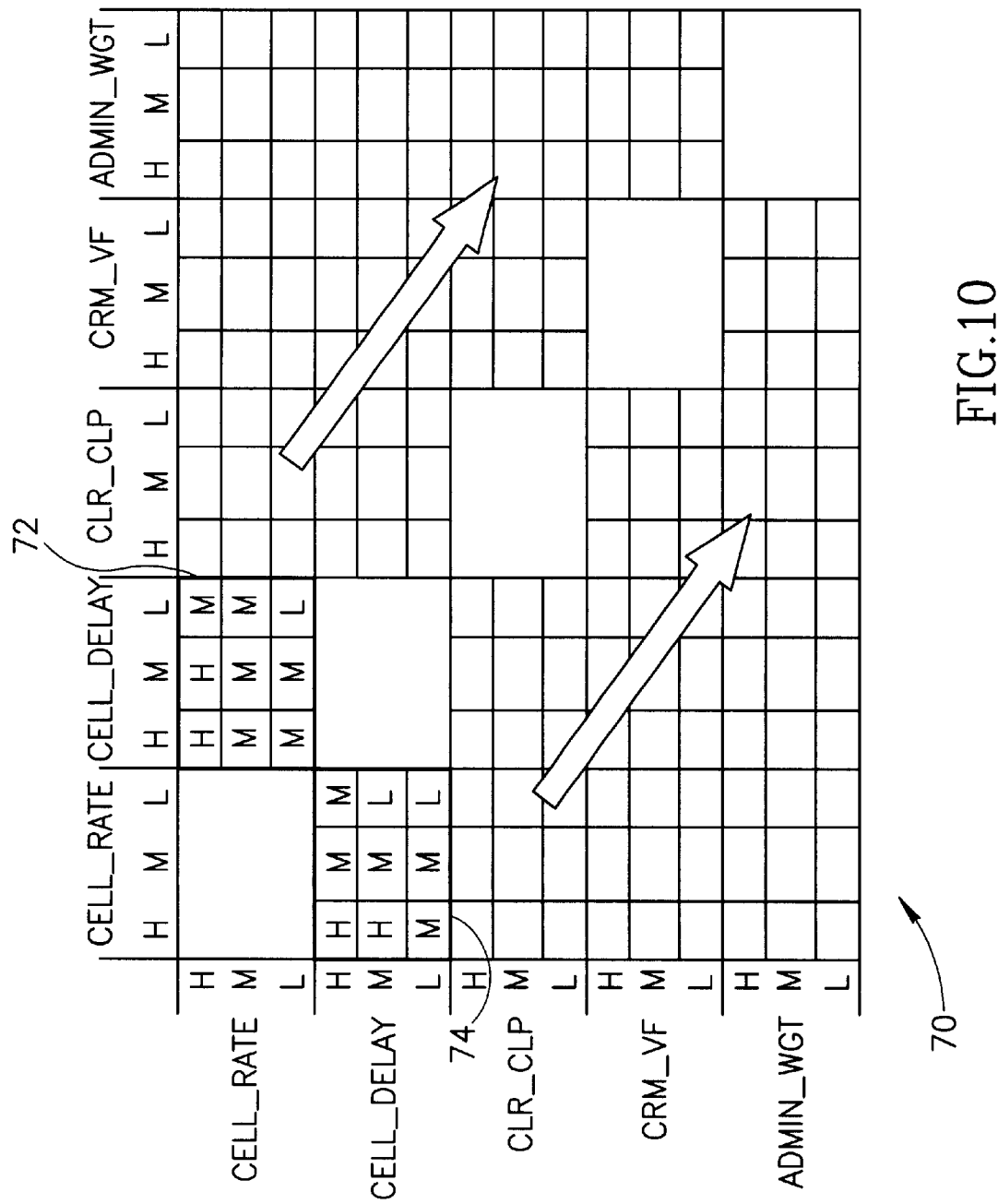
FIG. 10 is a table illustrating the second level of fuzzy rules for the fuzzy variable LINK_QUALITY.

The fuzzy output variable LINK_QUALITY is defined in addition to a set of rules which use the output values associated with each of the five groups. A table illustrating the second level of fuzzy rules for the fuzzy variable LINK_QUALITY is shown in FIG. 10. It is important to point out that the rules shown in FIG. 10 are not intended to limit the invention. Alternatively, the rules can be constructed to achieve different results and to embody different priorities for the represented groups depending on the actual application and implementation. A network manager or administrator can set the priorities among the different groups of metrics that ultimately determine the content of the rules in accordance with existing network policies, for example.

The rules table, generally referenced 70, comprises a five by five grid of 25 rule blocks. Each rule block comprises a three by three grid of 9 rules. Each rule comprises three rows representing HIGH, MEDIUM and LOW and three columns representing HIGH, MEDIUM and LOW. Due to repetition in the rules table 70, only two blocks of rules are shown. Rule blocks along the diagonal are meaningless as they correspond to groups paired off with themselves. The rule block 72 shown in the upper diagonal half of the table corresponds to the rules for the two groups CELL_RATE versus CELL_DELAY. These nine rules and the corresponding outputs are repeated for CELL_RATE vs. CLR_CLP, CELL_RATE vs. CRM_VF, CELL_RATE vs. ADMIN_WGT, CELL_DELAY vs. CLP_CLP, CELL_DELAY vs. CRM_VF, CELL_DELAY vs. ADMIN_WGT, CLR_CLP vs. CRM_VF, CLR_CLP vs. ADMJN_WGT and CRM_VF vs. ADMIN_WGT. A diagonal arrow indicates that the rule block 72 applies to the remainder of the upper diagonal half of the table 70.

The rule block 74 shown in the lower diagonal half of the table corresponds to the rules for the two groups CELL_DELAY vs. CELL_RATE. These nine rules and the corresponding outputs are repeated for CLR_CLP vs. CELL_RATE, CLR_CLP vs. CELL_DELAY, CLM_VF vs. CELL_RATE, CLM_VF vs. CELL_DELAY, CLM_VF vs. CLR_CLP, ADMIN_WGT vs. CELL_RATE, ADMIN_WGT vs. CELL_DELAY, ADMIN_WGT vs. CLR_CLP and ADMIN_WGT vs. CRM_VF. A diagonal arrow indicates that the rule block 74 applies to the remainder of the lower diagonal half of the table 70.

Note that one or more of the cells in the table 70 may optionally be left blank. This is one way assign different weights to different metrics. Any rule cell (or rule block) that is left blank indicates that no rule is being implemented for the corresponding intersection of metrics. In addition, when finalizing the results, different weights can be applied by having more or less rules associated with a metric. For example, for any total number of rules, a certain number will relate to metrics with high priority, a fewer number relate to metrics with medium priority and an even fewer number (or none) relate to metrics with the lowest priority.

As a result of applying the five groups of input values to the rules in table 70, a certain number of rules are likely to be triggered. For each rule triggered an intermediate output is generated. This intermediate outputs a degree of membership that is then converted into a crisp intermediate output using the centroid method and the degree of membership function for the LINK_QUALITY output of the system.

Figure 11:
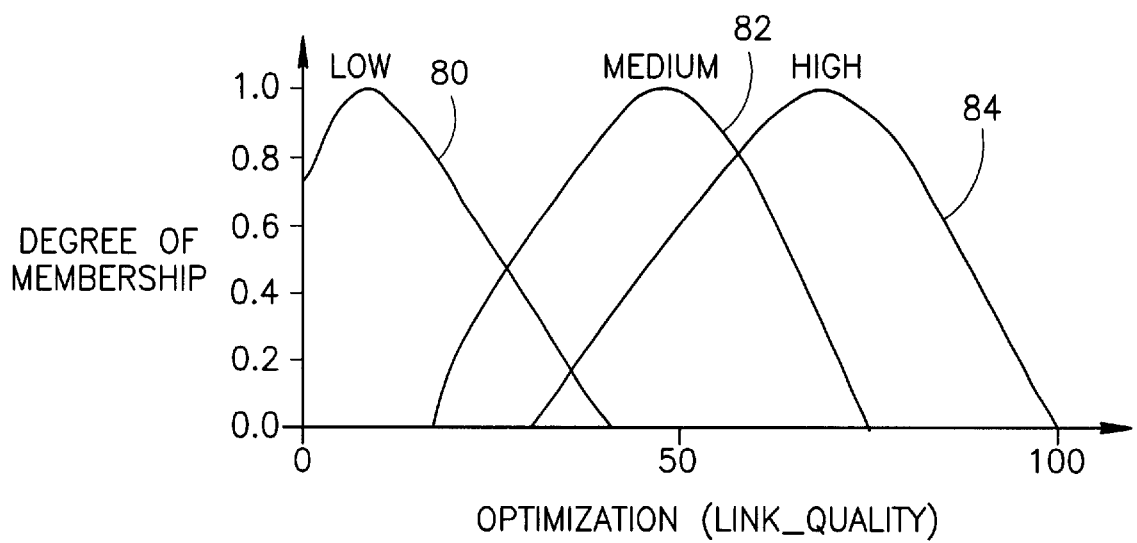
FIG. 11 is a diagram illustrating the degree of membership function for the LINK_QUALITY fuzzy output variable.

A diagram illustrating the degree of membership function for the LINK_QUALITY fuzzy output variable is shown in FIG. 11. This output has three fuzzy sets, HIGH 84, MEDIUM 82 and LOW 80. The LINK_QUALITY scale runs from 0 to 100. Thus, for each rule triggered a centroid value for the LINK_QUALITY is obtained. As was done in the first phase of fuzzy logic processing, the weighted-average method is used to convert the plurality of centroid values into a single crisp output value.

Once a single crisp output for the LINK_QUALITY is obtained, the process is repeated for each candidate route being considered.

Figure 12:
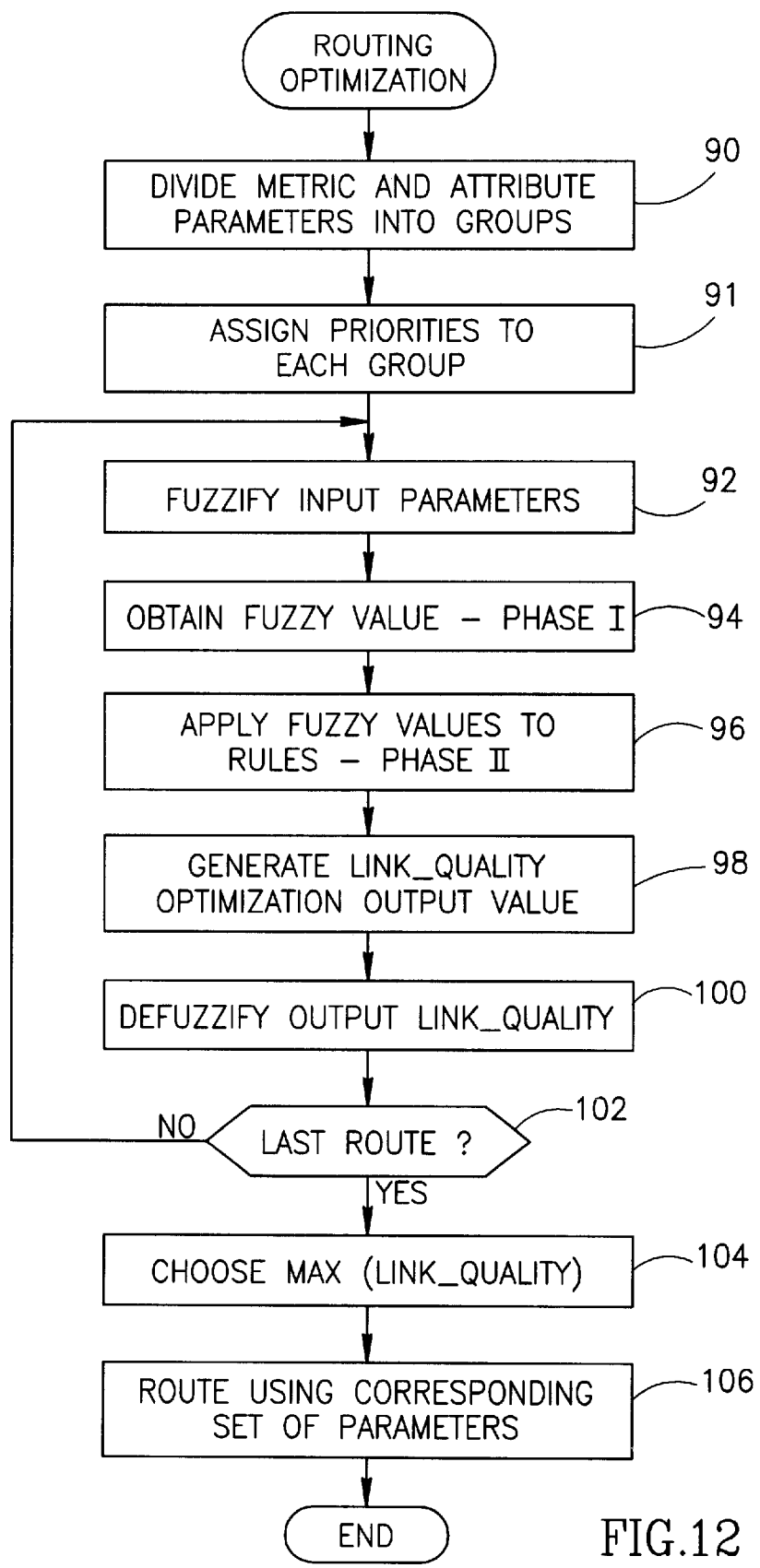
FIG. 12 is a flow diagram illustrating the fuzzy logic routing optimization method of the present invention.

A flow diagram illustrating the fuzzy logic routing optimization method of the present invention is shown in FIG. 12. Although described previously, the method will be described with reference to the flow diagram shown. First, the metrics, attributes and parameters are divided into two or more groups (step 90). Priorities are then assigned to each of the groups (step 91). The set of input values for the current route being considered is then fuzzified into fuzzy input values using the membership function associated with each input metric (step 92).

The fuzzy inputs are applied to the first phase fuzzy logic rules (step 94). As a result, a set of fuzzy outputs are obtained which are then defuzzified to crisp values, one for each group. For example, the centroid technique in combination with the weighted-average method can be used to obtain the crisp values for the first phase fuzzy logic processing.

The crisp values obtained for the first phase are applied to the second phase fuzzy logic rules (step 96). In a similar fashion to that of the first phase rules, one or more rules are triggered and output values are obtained which are then converted to a plurality of intermediate output values (step 98). From these intermediate values, a crisp final LINK_QUALITY output optimization value is obtained using the centroid and weighted-average techniques to perform defuzzification (step 100).

It is then determined whether the metrics for the last route have been processed (step 102). If not, the method repeats and the next set of metrics is read in and processed as described above. If there are no more routes to consider, the maximum LINK_QUALITY from among all the values calculated is chosen (step 104). The route corresponding to the maximum LINK_QUALITY is then selected as the route to the destination (step 106).

While the invention has been described with respect to a limited number of embodiments, it will be appreciated that many variations, modifications and other applications of the invention may be made.

What is claimed is:

1. A method of determining an optimum route in a network from among a plurality of candidate routes, said method comprising the steps of:

determining a plurality of metrics for evaluating link quality of each candidate route;

dividing said plurality of metrics into two or more groups, wherein the number of groups is smaller than the number of metrics and wherein each group represents two or more metrics;

assigning a priority to each group such that a range of priorities are assigned from a highest priority to a lowest priority;

first level fuzzy logic processing a plurality of input values corresponding to said plurality of metrics utilizing a first fuzzy logic rule set to generate a set of outputs, one for each group;

second level fuzzy logic processing said set of outputs of said first level fuzzy logic processing utilizing a second fuzzy logic rule set to generate a crisp output value corresponding to the link quality of a candidate route, wherein said second fuzzy logic rule set adapted to incorporate said priorities assigned to said groups of metrics; and selecting a route yielding a maximum link quality.

2. The method according to claim 1, wherein said step of first level fuzzy logic processing comprises obtaining crisp values utilizing a centroid technique for each rule with said first fuzzy logic rule set.

3. The method according to claim 1, wherein said step of first level logic pressing comprises utilizing a weighted-average technique to obtain a single crisp value from a plurality of crisp values generated from said first fuzzy logic rule set triggered by said input values.

4. The method according to claim 1, wherein said priorities are set by a network administrator in accordance with a network policy.

5. The method according to claim 1, further comprising the step of implementing said route yielding a maximum link quality utilizing the metrics corresponding thereto.

6. The method according to claim 1, wherein said first fuzzy logic rule set embodies different weights assigned to individual metrics.

7. A method of determining an optimum route in a network from among a plurality of candidate routes, said method comprising the steps of:

determine a plurality of metrics for evaluating link quality of each candidate route;

dividing said plurality of metrics into five groups, said five groups including a first group related to cell rate, a second group related to cell delay, a third group related to cell loss ratio and cell loss priority, a fourth group related to cell rate margin and variance factor, and a fifth group related to a weight used to aid in locating routes having minimal hop count, and wherein each group represents two or more metrics;

assigning a priority to each group such that a range of priorities are assigned from a highest priority to a lowest priority;

first level fuzzy logic processing a plurality of input values corresponding to said plurality of metrics utilizing a first fuzzy logic rule set to generate a set of outputs, one for each group;

second level fuzzy logic processing said set of outputs of said first level fuzzy logic processing utilizing a second fuzzy logic rule set to generate a crisp output value corresponding to the link quality of a candidate route, wherein said second fuzzy logic rule set adapted to incorporate said priorities assigned to said groups of metrics; and selecting a route yielding a maximum link quality.

8. The method according to claim 7, further comprising the step of implementing said route yielding a maximum link quality utilizing the metrics corresponding thereto.

9. The method according to claim 7, wherein said first fuzzy logic rule set embodies different weights is assigned to individual metrics.

10. The method according to claim 7, wherein said second fuzzy logic rule set embodies different weights assigned to individual groups.

11. The method according to claim 1, wherein said step of second level fuzzy logic processing comprises obtaining crisp values utilizing a centroid technique for each rule within said second fuzzy logic rule set.

12. The method according to claim 1, wherein said step of second level fuzzy logic processing comprises utilizing a weighted-average technique to obtain a single crisp value from a plurality of crisp values generated from said second fuzzy logic rule set triggered by said input values.

13. The method according to claim 1, wherein said second fuzzy logic rule set embodies different weights assigned to individual metrics.

14. The method according to claim 1, wherein the number of groups is five and comprises a first group related to cell rate, a second group related to cell delay, a third group related to cell loss ratio and cell loss priority, a fourth group related to cell rate margin and variance factor, and a fifth group related to a weight used to aid in locating routes having minimal hop count.

15. The method according to claim 7, wherein said priorities are set by a network administrator in accordance with a network policy.

16. A method of determining an optimum route in a Private Network to Network Interface (PNNI) based Asynchronous Transfer Mode (ATM) network from among a plurality of candidate routes, said method comprising the steps of:

determining a plurality of ATM cell related metrics for evaluating link quality of each candidate route;

dividing said plurality of metrics into five groups, said five groups including a first group related to cell rate, a second group related to cell delay, a third group related to cell loss ratio and cell loss priority, a fourth group related to cell rate margin and variance factor, and a fifth group related to a weight used to aid in locating routes having minimal hop count, and wherein each group represents two or more metrics;

assigning a priority to each group such that a range of priorities are assigned from a highest priority to a lowest priority;

first level fuzzy logic processing a plurality of input values corresponding to said plurality of metrics utilizing a first fuzzy logic rule set to generate a set of outputs, one for each group;

second level fuzzy logic processing said set of outputs of said first level fuzzy logic processing utilizing a second fuzzy logic rule set to generate a crisp output value corresponding to the link quality of a candidate route, wherein said second fuzzy logic rule set adapted to incorporate said priorities assigned to said groups of metrics; and selecting a route yielding a maximum link quality.

17. The method according to claim 16, wherein said priorities are set from highest to lowest in the following order: said first group, said second group, said third group, said fourth groups and said fifth group.

* * * * *